(12) United States Patent
Cook et al.

(10) Patent No.: US 11,444,493 B2
(45) Date of Patent: Sep. 13, 2022

(54) TECHNIQUES FOR DETECTING THE PRESENCE OF A FOREIGN OBJECT ON THE SURFACE OF A WIRELESS CHARGING TRANSMITTER BY MEASURING QUALITY FACTOR DURING A CHARGING SESSION

(71) Applicant: Aptiv Technologies Limited, St. Michael (BB)

(72) Inventors: James R. Cook, Poland, OH (US); Nicolas A. Carbone, Cortland, OH (US)

(73) Assignee: APTIV TECHNOLOGIES LIMITED, St. Michael (BB)

(*) Notice: Subject to any disclaimer, the term of this patent is extended or adjusted under 35 U.S.C. 154(b) by 0 days.

(21) Appl. No.: 17/074,825

(22) Filed: Oct. 20, 2020

(65) Prior Publication Data

US 2022/0123602 A1     Apr. 21, 2022

(51) Int. Cl.
| | |
|---|---|
| *H02J 50/60* | (2016.01) |
| *H02J 50/10* | (2016.01) |
| *H02J 50/40* | (2016.01) |
| *H02J 7/06* | (2006.01) |
| *H02J 50/90* | (2016.01) |

(52) U.S. Cl.
CPC .............. *H02J 50/60* (2016.02); *H02J 7/06* (2013.01); *H02J 50/10* (2016.02); *H02J 50/402* (2020.01); *H02J 50/90* (2016.02)

(58) Field of Classification Search
CPC ..................................................... H02J 50/60
USPC ......................................................... 320/108
See application file for complete search history.

(56) References Cited

U.S. PATENT DOCUMENTS

| | | | |
|---|---|---|---|
| 9,287,718 B2 | 3/2016 | Kari et al. | |
| 9,423,439 B2 | 8/2016 | Jung et al. | |
| 9,735,605 B2 | 8/2017 | Briz et al. | |
| 10,023,059 B2 | 7/2018 | Roehrl et al. | |
| 2017/0117756 A1* | 4/2017 | Muratov | H02J 7/025 |
| 2019/0296590 A1* | 9/2019 | Chae | H02J 50/12 |

* cited by examiner

*Primary Examiner* — Edward Tso
*Assistant Examiner* — Ahmed H Omar
(74) *Attorney, Agent, or Firm* — RMCK Law Group, PLC

(57) ABSTRACT

Inductive charging systems and methods detect a wireless device upon a charging surface of a wireless charging pad including a transmitter coil, determine a first quality factor of the transmitter coil and initiate a charging session, and during the charging session, periodically perform a foreign object detection (FOD) technique including adjusting an operating point of the transmitter coil according to a specific sequence of operating points that causes rectifier diodes between the receiver coil and a receiver load of the wireless device to be reverse biased to disconnect the receiver load from the receiver coil and then determining a second quality factor of the transmitter coil, and detecting whether a foreign object is present on the charging surface based on a comparison between the first and second quality factors.

20 Claims, 3 Drawing Sheets

TECHNIQUES FOR DETECTING THE PRESENCE OF A FOREIGN OBJECT ON THE SURFACE OF A WIRELESS CHARGING TRANSMITTER BY MEASURING QUALITY FACTOR DURING A CHARGING SESSION

FIELD

The present disclosure generally relates to inductive charging and, more particularly, to techniques for detecting the presence of a foreign object on the surface of a wireless charging transmitter by measuring quality factor during a charging session, particularly for automotive applications.

BACKGROUND

Inductive charging is a type of wireless power transfer that uses electromagnetic induction to provide electrical energy to mobile or wireless devices (e.g., mobile phones). This is typically performed by placing a wireless device on a wireless charging pad defining a charging surface and comprising a plurality of transmitter coils configured for inductive coupling with and wireless power transfer to a receiver coil of the wireless device. One potential risk of inductive or wireless charging (e.g., using inductive coupling frequencies between 80 kilohertz (kHz) to 210 kHz) is the heating of objects on or near the charging surface to potentially dangerous temperatures. For example, it is possible that such "foreign objects" could be placed on or near the charging surface at any time (i) prior to the placement of a wireless device on the charging surface, (ii) concurrently with the placement of the wireless device on the charging surface, or (iii) after the wireless device has been placed on the charging surface and a charging session has already begun. Conventional inductive charging systems suffer from the inability to reliably detect foreign objects during charging sessions and, in particular, small or ferrous objects. Thus, while these conventional inductive charging systems do work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an inductive charging system is presented. In one exemplary implementation, the inductive charging system comprises a transmitter coil configured to, when active, inductively transfer power to a receiver coil of a wireless device, wherein the wireless device comprises rectifier diodes between the receiver coil and a receiver load and a controller configured to detect the wireless device upon a charging surface proximate to the transmitter coil, in response to detecting the wireless device, determine a first quality factor of the transmitter coil and initiate a charging session during which the transmitter coil is activated to inductively couple with the receiver coil and inductively transfer electrical energy thereto, during the charging session, periodically perform a foreign object detection (FOD) technique comprising adjusting an operating point of the transmitter coil according to a specific sequence of operating points that causes the rectifier diodes to be reverse biased to disconnect the receiver load from the receiver coil, in response to adjusting the operating point of the transmitter coil according to the specific sequence, determining a second quality factor of the transmitter coil, and detecting whether a foreign object is present on the charging surface based on a comparison between the first and second quality factors.

In some implementations, the controller is configured to detect that the foreign object is present when a difference between the first and second quality factors exceeds a threshold. In some implementations, the controller is configured to begin the specific sequence of operating points of the transmitter coil by increasing the operating point of the transmitter coil from a normal level to a first level for a first period, which causes the wireless device to transmit back a control error packet (CEP). In some implementations, the controller is configured to subsequently decrease the operating point of the transmitter coil from the first level to a second level for a second period.

In some implementations, a duration of the second period and the first level are determined such that the CEP is determined such that the wireless device does not indicate that power transfer contact has been broken. In some implementations, the controller is configured to subsequently increase the operating point of the transmitter coil from the second level to the first level for a third period along with determining the second quality factor. In some implementations, the controller is configured to subsequently decrease the operating point of the transmitter coil back to the normal level to complete the specific sequence of operating points of the transmitter coil. In some implementations, the controller is further configured to, in response to detecting that the foreign object is present, terminate the charging session.

According to another aspect of the present disclosure, an inductive charging method is presented. In one exemplary implementation, the inductive charging method comprises providing a wireless charging pad comprising a transmitter coil configured to, when active, inductively transfer power to a receiver coil of a wireless device, wherein the wireless device comprises rectifier diodes between the receiver coil and a receiver load, detecting, by a controller of the wireless charging pad, the wireless device upon a charging surface proximate to the transmitter coil, and in response to detecting the wireless device, determining, by the controller, a first quality factor of the transmitter coil and initiate a charging session during which the transmitter coil is activated to inductively couple with the receiver coil and inductively transfer electrical energy thereto, during the charging session, periodically performing, by the controller, a FOD technique comprising adjusting an operating point of the transmitter coil according to a specific sequence of operating points that causes the rectifier diodes to be reverse biased to disconnect the receiver load from the receiver coil, in response to adjusting the operating point of the transmitter coil according to the specific sequence, determining a second quality factor of the transmitter coil, and detecting whether a foreign object is present on the charging surface based on a comparison between the first and second quality factors.

In some implementations, the foreign object is detected to be present when a difference between the first and second quality factors exceeds a threshold. In some implementations, the FOD technique comprises beginning the specific sequence of operating points of the transmitter coil by increasing the operating point of the transmitter coil from a normal level to a first level for a first period, which causes the wireless device to transmit back a CEP. In some implementations, the FOD technique comprises subsequently decreasing the operating point of the transmitter coil from the first level to a second level for a second period.

In some implementations, a duration of the second period and the first level are determined such that the CEP is determined such that the wireless device does not indicate that power transfer contact has been broken. In some implementations, the FOD technique comprises subsequently increasing the operating point of the transmitter coil from the second level to the first level for a third period along with determining the second quality factor. In some implementations, the FOD technique comprises subsequently decreasing the operating point of the transmitter coil back to the normal level to complete the specific sequence of operating points of the transmitter coil. In some implementations, the method further comprises in response to detecting that the foreign object is present, terminating, by the controller, the charging session.

According to yet another aspect of the present disclosure, an induction charging system is presented. In one exemplary implementation, the inductive charging system comprises a transmitter coil means for, when active, inductively transferring power to a receiver coil of a wireless device, wherein the wireless device comprises rectifier diodes between the receiver coil and a receiver load and a controller means for detecting the wireless device upon a charging surface proximate to the transmitter coil, in response to detecting the wireless device, determining a first quality factor of the transmitter coil and initiating a charging session during which the transmitter coil is activated to inductively couple with the receiver coil and inductively transfer electrical energy thereto, and during the charging session, periodically performing a FOD technique comprising adjusting an operating point of the transmitter coil according to a specific sequence of operating points that causes the rectifier diodes to be reverse biased to disconnect the receiver load from the receiver coil, in response to adjusting the operating point of the transmitter coil according to the specific sequence, determining a second quality factor of the transmitter coil, and detecting whether a foreign object is present on the charging surface based on a comparison between the first and second quality factors.

In some implementations, the controller means detects that the foreign object is present when a difference between the first and second quality factors exceeds a threshold. In some implementations, the controller means increases the operating point of the transmitter coil from a normal level to a first level for a first period, which causes the wireless device to transmit back a CEP, subsequently decreases the operating point of the transmitter coil from the first level to a second level for a second period, wherein a duration of the second period and the first level are determined such that the CEP is determined such that the wireless device does not indicate that power transfer contact has been broken, subsequently increases the operating point of the transmitter coil from the second level to the first level for a third period along with determining the second quality factor, and subsequently decrease the operating point of the transmitter coil back to the normal level to complete the specific sequence of operating points of the transmitter coil. In some implementations, the controller means, in response to detecting that the foreign object is present, terminates the charging session.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
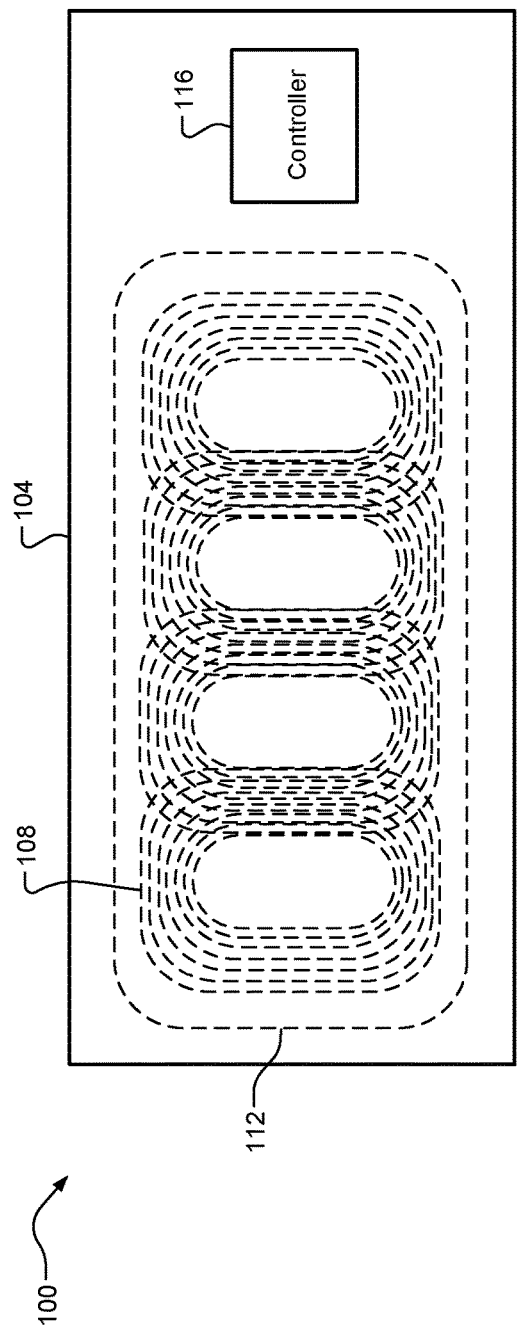
FIGS. 1A-1B are overhead views of an example wireless charging pad comprising a plurality of transmitter coils arranged in a linear, overlapping arrangement according to some implementations of the present disclosure and an example wireless device comprising a receiver coil.

As previously discussed, conventional inductive charging systems suffer from the inability to reliably detect foreign objects during charging sessions and, in particular, small or ferrous objects. One potential solution is foreign object detection (FOD) based on power loss accounting, which involves the wireless charging pad and the wireless device measuring transmitted and received power, respectively. If the difference exceeds a threshold, a foreign object is assumed to be present. Another potential solution is FOD based on quality factor change, which involves the wireless charging pad measuring the quality factor of the transmitter coil(s) after the wireless receiver has been placed on the charging surface and a reference quality factor measured by the wireless device during a previous calibration process and subsequently provided to the wireless charging pad. If the two quality factors differ by greater than a threshold, a foreign object is assumed to be present. Both of these solutions suffer in detecting smaller or ferrous foreign objects as the wireless receiver device typically has poor accuracy in measuring received power and has a low reference quality factor such that foreign objects may cause only a small change in the quality factor measured by the transmitter. This results in larger thresholds typically being used to reduce false positives at the risk of failing to detect smaller or ferrous foreign objects.

Yet another potential solution is FOD based on reflected impedance change, which involves the wireless charging pad measuring its impedance and comparing it to a reference impedance previously measured in a calibration process. If the two impedances differ by more than a threshold, the wireless charging pad can determine that the object is not the wireless device and thus a foreign object is assumed to be present. This solution suffers from its inability to be utilized during a charging session, i.e., the impedance is measured during a process before the charging session, and thus a foreign object placed on the charging surface concurrently with the wireless device or thereafter cannot be detected with this method. As can be seen, even combinations of these potential solutions would not fully solve the problem of detecting small and ferrous objects during a charging session. Temporarily interrupting or halting the charging session is also not ideal. Accordingly, improved FOD techniques during charging sessions and without power transfer interruption are presented. These techniques involve the wireless charging pad periodically performing a specific sequence during a charging session in which the wireless charging pad raises and lowers its operating point (current, frequency, etc.) to reverse bias rectifier diodes in the wireless receiver device that causes a receiver load of the wireless device to disconnect from the receiver coil. When this occurs, the quality factor measured at the transmitter coil(s) is unaffected by the receiver load and can be directly compared to the quality factor measured when the wireless device was initially placed on the wireless charging pad charging surface.

Figure 1B:
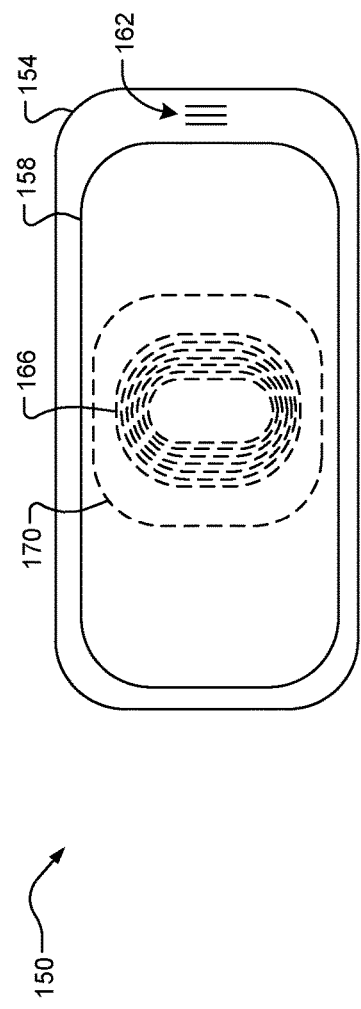

FIGS. 1A-1B illustrate an example wireless charging pad 100 according to some implementations of the present disclosure and an example wireless device 150 (e.g., a mobile phone). The wireless charging pad 100 comprises a housing 104 that houses a plurality of transmitter coils 108 arranged atop a sheet of ferrite material 112. While a linear, overlapping configuration of the plurality of four transmitter coils 108 is illustrated and specifically discussed herein, it will be appreciated that the techniques of the present disclosure could be applicable to other numbers and/or configurations of a plurality of transmitter coils (e.g., a two-dimensional array). A controller 116 controls operation of the wireless charging pad 100, which primarily includes monitoring electrical parameters of and selectively activating/deactivating (i.e., providing power to) the plurality of transmitter coils 108. While the wireless device 150 is shown to be a mobile phone, it will be appreciated that the wireless device 150 could be any suitable device having a receiver coil configured to receive inductive power transfer. The wireless device 150 comprises a housing 154 that houses various user-facing components (a touch display 158, a speaker/microphone 162, etc.) as well as a receiver coil 166 arranged atop a sheet of ferrite material 170.

Figure 2A:
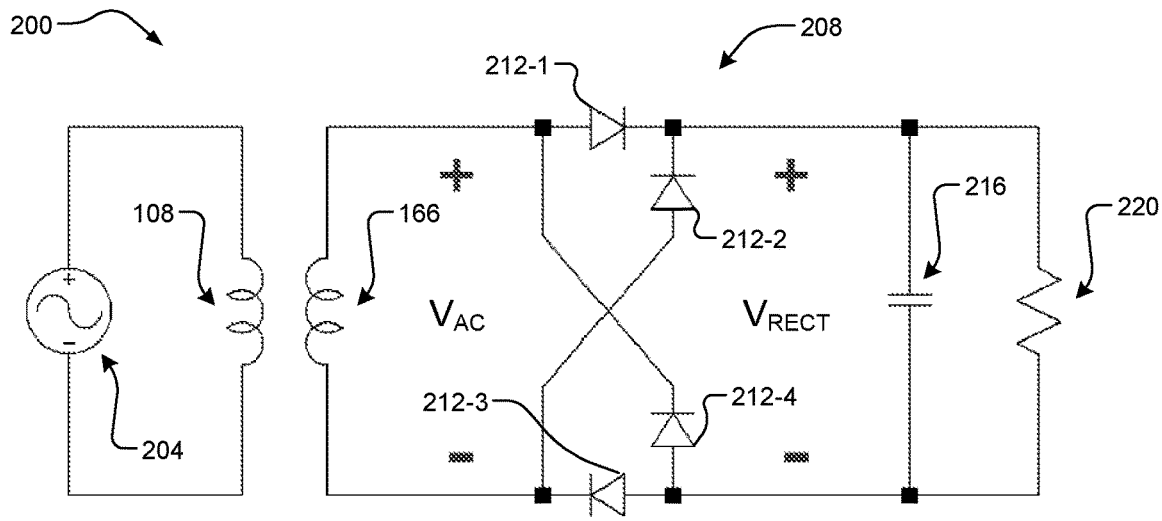
FIGS. 2A-2C illustrate an example circuit diagram for interaction between the wireless charging pad and the wireless device and plots of a specific sequence of transmitter operating points and its effect on receiver voltage levels according to some implementations of the present disclosure.
Figure 2B:
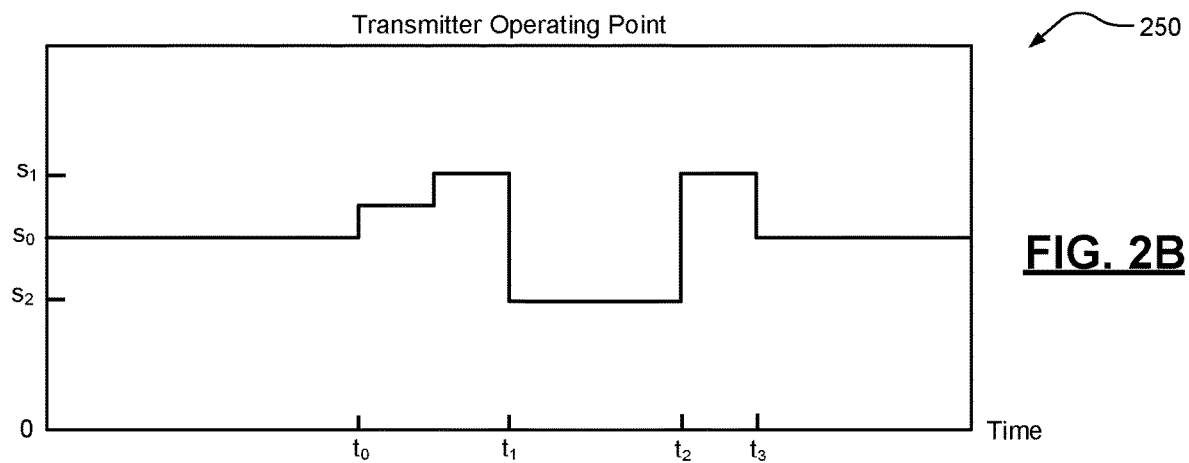
Figure 2C:
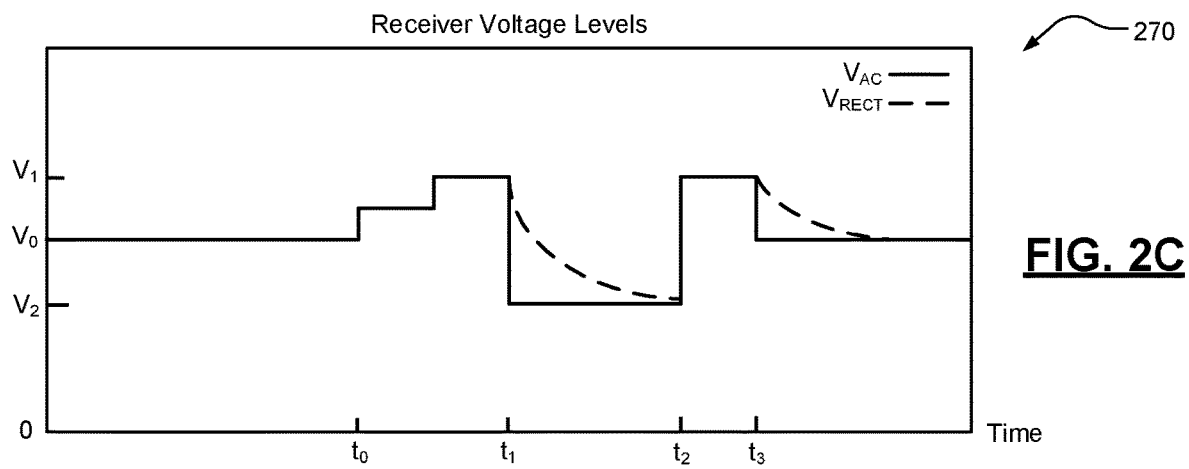

Referring now to FIGS. 2A-2C, an example circuit diagram 200 for interaction between the wireless charging pad 100 and the wireless device 150 and plots 250, 270 of a specific sequence of transmitter operating points and its effect on receiver voltage levels according to some implementations of the present disclosure are illustrated. In FIG. 2A, a simplified circuit diagram 200 of a transmitter/receiver system is illustrated. The transmitter is the wireless charging pad 100 with its one or more active transmitter coils 108 and an AC power source 204. The receiver is the wireless device 150 with its receiver coil 166. $V_{AC}$ represents the peak AC voltage measured across the receiver coil 166. $V_{RECT}$ represents the DC voltage measured across the output of the full-wave rectifier 208 comprising four rectifier diodes 212-1 . . . 212-4 (collectively, "rectifier diodes 208"). The wireless device 150 further comprises a hold-up capacitor 216 and a resistive load 220 (also referred to herein as "wireless load 220"). For example, the wireless load 220 could be a battery of the wireless device 150.

Figure 3:
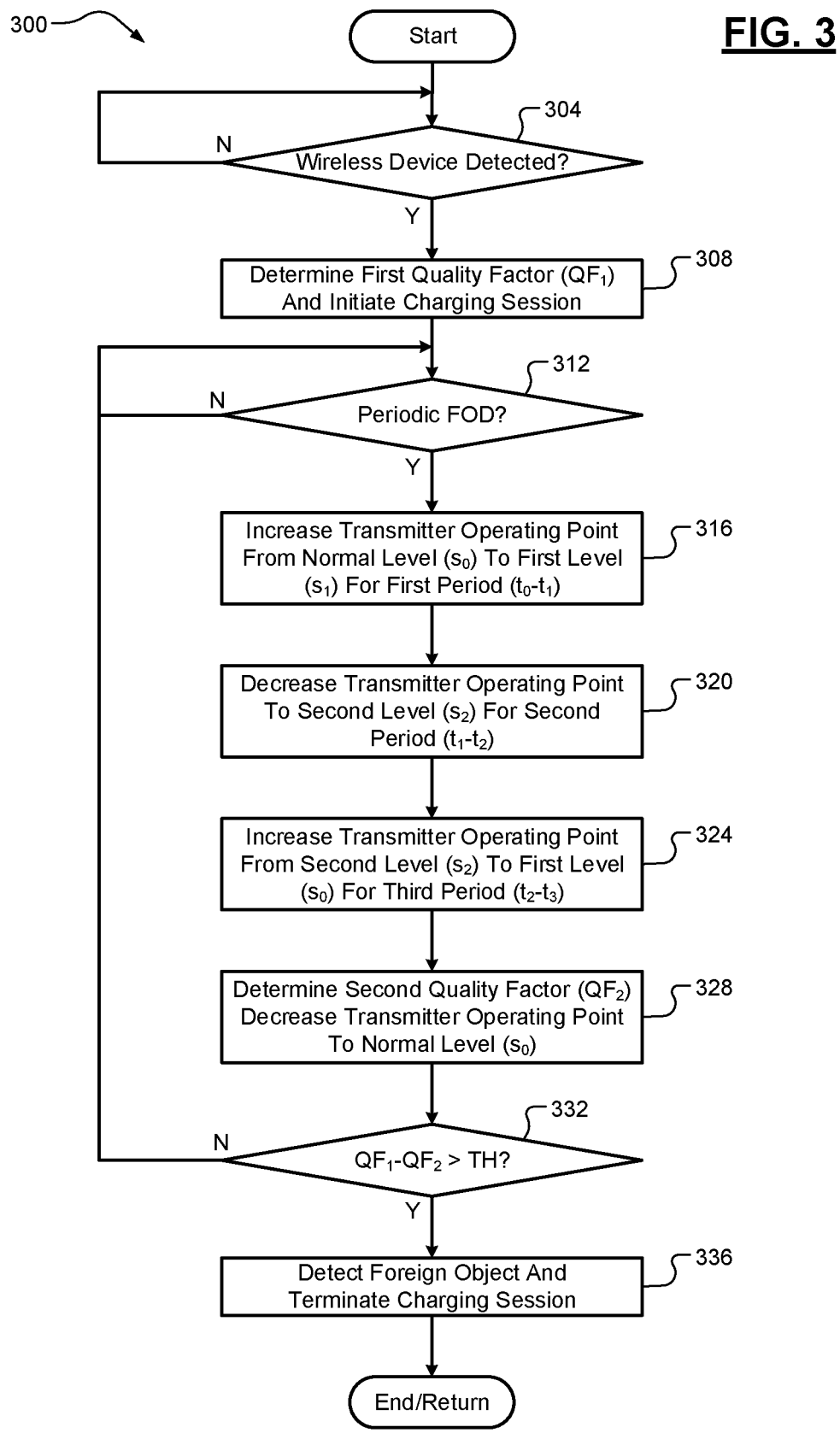
FIG. 3 is a flow diagram of an example inductive charging method according to some implementations of the present disclosure.

Referring now to FIG. 3 and with continued reference to FIGS. 2A-2C, a flow diagram of an example inductive charging method 300 according to some implementations of the present disclosure. While the components of FIG. 1 and FIG. 2A are specifically referenced, it will be appreciated that the inductive charging method 300 could be applicable to any suitable transmitter/receiver devices. At 304, the controller 116 detects whether the wireless device 150 has been placed on or atop the charging surface proximate to the transmitter coil(s) 108. When true, the method 300 proceeds to 308. Otherwise, the method 300 ends or returns to 304. At 308, the controller 116 determines a first quality factor ($QF_1$) of the active transmitter coil(s) 108 and initiates a charging session. At 312, the controller 116 determines whether a periodic FOD determination operation is to occur. For example, the FOD could be determined at a periodic rate throughout the charging session. When true, the method 300 proceeds to 316. Otherwise, the method 300 returns to 312. At 316, the specific sequence of operating points of the transmitter (the wireless charging pad 100) that causes a temporary disconnection of the receiver coil 166 from the wireless load 220 begins.

As can be seen in FIG. 2B, the controller 116 increases the operating point of the wireless charging pad 100 from a normal level ($s_0$) to a first level ($s_1$) for a first period (time $t_0$ to time $t_1$), such as in a stepped manner as illustrated. The increase of the operating point of the wireless charging pad 100 causes the wireless device 150 to communicate back a control error packet (CEP) in a target range. The CEP is proportional to the amount of change in the rectifier voltage $V_{RECT}$ that is needed to meet its voltage target. The magnitude of the first level Si and is a target level intended to cause the return of the CEP within a target range ($CEP_{MIN}$ to $CEP_{MAX}$), indicating that the rectified voltage $V_{RECT}$ is higher than its voltage target. The CEP target level and the time duration ($t_2-t_1$) are chosen or determined such that the wireless device 150 does not indicate that power transfer contact has been broken (i.e., no visual, audible, or tactile indication to the user). At 320, the controller 116 lowers the operating point of the wireless charging pad 100 to a second level ($s_2$, with $0<s_2/s_1<1$) for a second period (time $t_1$ to time $t_2$). At 324, the controller 116 increases the operating point of the wireless charging pad 100 back to the first level $s_1$ for a third period (time $t_2$ to time $t_3$).

It should also be noted that the rectifier voltage ($V_{RECT}$) never actually reaches the magnitude $V_2$ of the AC voltage $V_{AC}$ at time $t_2$ when the magnitude of the AC voltage $V_{AC}$ is then increased to the magnitude $V_1$ in response to another operating point change as this would cause the rectifier diodes 212 (see below) to conduct current. Finally, at 328, the controller 116 determines a second quality factor ($QF_2$) of the active transmitter coil(s) 108 and decreases the operating point of the wireless charging pad back to the original normal level $s_0$. The purpose of this specific sequence of operating point changes is to cause the receiver diodes 212 to reverse bias and thereby disconnect the receiver coil 166 from the wireless load 220. In doing so, the active transmitter coil(s) 108 are not affected by the wireless device 150, which provides for a highly accurate quality factor determination. At 332, the controller 116 determines whether a difference between the first and second quality factors ($QF_1-QF_2$) exceeds a threshold (TH), such as a percentage. When true, it can be assumed that a foreign object has been placed on the charging surface during the charging session and is causing the reduced quality factor and the controller 116 can terminate the charging session at 336 and the method 300 can end or return to 304. Otherwise, the method 300 returns to 312 (e.g., until the charging session otherwise ends or another periodic FOD cycle occurs.

This method can be used regardless of whether or not the wireless power receiver supports FOD based on quality factor change. Also, since this method utilizes only measurements by the transmitter, the level of accuracy of the receiver measurements do not affect the sensitivity of this method.

In another embodiment, instead of quality factor, the individual components of impedance (i.e., resistance and reactance) may be used as metrics for FOD. By looking at the individual components of impedance, the sensitivity of the FOD technique would likely be enhanced; however, some transmitter designs (e.g., wireless charging pads) cannot measure the individual components of impedance directly, and in that case quality factor based FOD would be preferred.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inductive charging system, comprising:
   a transmitter coil configured to, when active, inductively transfer power to a receiver coil of a wireless device, wherein the wireless device comprises rectifier diodes between the receiver coil and a receiver load; and
   a controller configured to:
     detect the wireless device upon a charging surface proximate to the transmitter coil;
     in response to detecting the wireless device, determine a first quality factor of the transmitter coil and initiate a charging session during which the transmitter coil is activated to inductively couple with the receiver coil and inductively transfer electrical energy thereto; and during the charging session, periodically perform a foreign object detection (FOD) technique comprising:

adjusting an operating point of the transmitter coil according to a specific sequence of operating points that causes the rectifier diodes to be reverse biased to disconnect the receiver load from the receiver coil;

in response to adjusting the operating point of the transmitter coil according to the specific sequence, determining a second quality factor of the transmitter coil; and detecting whether a foreign object is present on the charging surface based on a comparison between the first and second quality factors.

2. The inductive charging system of claim 1, wherein the controller is configured to detect that the foreign object is present when a difference between the first and second quality factors exceeds a threshold.

3. The inductive charging system of claim 1, wherein the controller is configured to begin the specific sequence of operating points of the transmitter coil by increasing the operating point of the transmitter coil from a normal level to a first level for a first period, which causes the wireless device to transmit back a control error packet (CEP).

4. The inductive charging system of claim 3, wherein controller is configured to subsequently decrease the operating point of the transmitter coil from the first level to a second level for a second period.

5. The inductive charging system of claim 4, wherein a duration of the second period and the first level are determined such that the CEP is determined such that the wireless device does not indicate that power transfer contact has been broken.

6. The inductive charging system of claim 4, wherein the controller is configured to subsequently increase the operating point of the transmitter coil from the second level to the first level for a third period along with determining the second quality factor.

7. The inductive charging system of claim 6, wherein the controller is configured to subsequently decrease the operating point of the transmitter coil back to the normal level to complete the specific sequence of operating points of the transmitter coil.

8. The inductive charging system of claim 2, wherein the controller is further configured to, in response to detecting that the foreign object is present, terminate the charging session.

9. An inductive charging method, comprising:
providing a wireless charging pad comprising a transmitter coil configured to, when active, inductively transfer power to a receiver coil of a wireless device, wherein the wireless device comprises rectifier diodes between the receiver coil and a receiver load;

detecting, by a controller of the wireless charging pad, the wireless device upon a charging surface proximate to the transmitter coil;

in response to detecting the wireless device, determining, by the controller, a first quality factor of the transmitter coil and initiate a charging session during which the transmitter coil is activated to inductively couple with the receiver coil and inductively transfer electrical energy thereto; and during the charging session, periodically performing, by the controller, a foreign object detection (FOD) technique comprising:

adjusting an operating point of the transmitter coil according to a specific sequence of operating points that causes the rectifier diodes to be reverse biased to disconnect the receiver load from the receiver coil;

in response to adjusting the operating point of the transmitter coil according to the specific sequence, determining a second quality factor of the transmitter coil; and detecting whether a foreign object is present on the charging surface based on a comparison between the first and second quality factors.

10. The inductive charging method of claim 9, wherein the foreign object is detected to be present when a difference between the first and second quality factors exceeds a threshold.

11. The inductive charging method of claim 9, wherein the FOD technique comprises beginning the specific sequence of operating points of the transmitter coil by increasing the operating point of the transmitter coil from a normal level to a first level for a first period, which causes the wireless device to transmit back a control error packet (CEP).

12. The inductive charging method of claim 11, wherein the FOD technique comprises subsequently decreasing the operating point of the transmitter coil from the first level to a second level for a second period.

13. The inductive charging method of claim 12, wherein a duration of the second period and the first level are determined such that the CEP is determined such that the wireless device does not indicate that power transfer contact has been broken.

14. The inductive charging method of claim 12, wherein the FOD technique comprises subsequently increasing the operating point of the transmitter coil from the second level to the first level for a third period along with determining the second quality factor.

15. The inductive charging method of claim 14, wherein the FOD technique comprises subsequently decreasing the operating point of the transmitter coil back to the normal level to complete the specific sequence of operating points of the transmitter coil.

16. The inductive charging method of claim 10, further comprising in response to detecting that the foreign object is present, terminating, by the controller, the charging session.

17. An induction charging system, comprising:
a transmitter coil means for, when active, inductively transferring power to a receiver coil of a wireless device, wherein the wireless device comprises rectifier diodes between the receiver coil and a receiver load; and a controller means for:
detecting the wireless device upon a charging surface proximate to the transmitter coil;

in response to detecting the wireless device, determining a first quality factor of the transmitter coil and initiating a charging session during which the transmitter coil is activated to inductively couple with the receiver coil and inductively transfer electrical energy thereto; and during the charging session, periodically performing a foreign object detection (FOD) technique comprising:

adjusting an operating point of the transmitter coil according to a specific sequence of operating points that causes the rectifier diodes to be reverse biased to disconnect the receiver load from the receiver coil;

in response to adjusting the operating point of the transmitter coil according to the specific sequence, determining a second quality factor of the transmitter coil; and detecting whether a foreign object is present on the charging surface based on a comparison between the first and second quality factors.

18. The inductive charging system of claim 17, wherein the controller means detects that the foreign object is present when a difference between the first and second quality factors exceeds a threshold.

19. The inductive charging system of claim 17, wherein the controller means:

increases the operating point of the transmitter coil from a normal level to a first level for a first period, which causes the wireless device to transmit back a control error packet (CEP);

subsequently decreases the operating point of the transmitter coil from the first level to a second level for a second period, wherein a duration of the second period and the first level are determined such that the CEP is determined such that the wireless device does not indicate that power transfer contact has been broken;

subsequently increases the operating point of the transmitter coil from the second level to the first level for a third period along with determining the second quality factor; and subsequently decrease the operating point of the transmitter coil back to the normal level to complete the specific sequence of operating points of the transmitter coil.

20. The inductive charging system of claim 18, wherein the controller means, in response to detecting that the foreign object is present, terminates the charging session.

* * * * *